United States Patent [19]

Ishikawa et al.

[11] Patent Number: 6,020,940
[45] Date of Patent: Feb. 1, 2000

[54] LIQUID CRYSTAL PROJECTOR AND METHOD OF DRIVING THE PROJECTOR

[75] Inventors: Yoshimoto Ishikawa; Tetsuo Kanno, both of Kanagawa-ken, Japan

[73] Assignee: International Business Machines Corp., Armonk, N.Y.

[21] Appl. No.: 09/006,744

[22] Filed: Jan. 13, 1998

[30] Foreign Application Priority Data

Jan. 17, 1997 [JP] Japan ................................. 9-006516
Sep. 9, 1997 [JP] Japan ................................. 9-244323

[51] Int. Cl.[7] .................................................. G02F 1/1335
[52] U.S. Cl. .................................................. 349/8; 353/49
[58] Field of Search ............................... 349/5, 7, 8, 10; 353/32, 33, 37, 49, 82, 101

[56] References Cited

U.S. PATENT DOCUMENTS 5,726,719  3/1998  Tanaka et al. ............................ 349/8
5,801,794  9/1998  Lehureau et al. ......................... 349/8
5,897,190  4/1999  Takahashi ................................ 349/8

FOREIGN PATENT DOCUMENTS 59-230383  12/1984  Japan.
4-60538    2/1992  Japan.

*Primary Examiner*—James Dudek
*Attorney, Agent, or Firm*—Scully, Scott, Murphy & Presser; Jay P. Sbrollini, Esq.

[57] ABSTRACT

The present invention is directed to a liquid crystal projector comprising a light source for emitting white light, a separation mechanism for separating the white light into light beams with a plurality of colors at different angles, a liquid crystal panel for giving the light beams optical modulation, a lens mechanism for converging the light beams so that the light beams are incident upon respective pixels of the liquid crystal panel, a mechanism for magnifying and projecting the light beams emergent from the liquid crystal panel, and a moving mechanism for moving an incident position of the light beams on the liquid crystal panel an amount of an integer times a pitch between the pixels.

10 Claims, 5 Drawing Sheets

LIQUID CRYSTAL PROJECTOR AND METHOD OF DRIVING THE PROJECTOR

BACKGROUND OF THE INVENTION

1. Technical Field

The present invention relates to a projector employing a liquid crystal cell as an optical means of modulation (liquid crystal projector). The present invention relates particularly to so-called liquid crystal light-valve that employs only a single liquid crystal light-valve and performs color display (single-light-valve type liquid crystal projector).

2. Prior Art

The cathode-ray-tube (CRT) method has been employed for many years as an apparatus which projects and displays on an enlarged scale an image, such as a television. In contrast with this, there is a method that displays such an image by the use of a liquid crystal projector (liquid projector method). The liquid crystal projector method, as compared with the CRT method, has excellent characteristics such that a range of color reproduction is wide, miniaturization and lightening of weight are easy, and adjustment of convergence is not needed.

On one hand, the liquid crystal method, as compared with the CRT method, has the commercial disadvantage that the cost is high, in addition to the disadvantages of the display characteristics that the luminance is small and the dynamic-image display characteristic is not good. However, it is also undeniable that the liquid crystal method has the advantages of the display characteristics that uniform luminance is obtained on a screen and there is less flickering of a screen. In the comparison of both methods such as this, what is regarded as a serious problem is the cost of the liquid crystal method. The problem of cost is related to an enhancement in the luminance of the liquid crystal projector. That is, since a liquid crystal device itself does not emit light, there is a need to provide an additional light source and accordingly a high-luminance light source takes an additional cost. In addition, since the size is increased, the advantages of the liquid crystal method cannot be utilized.

In addition to this, the cost of the liquid crystal device itself has become a problem. When performing color display with the liquid projector method there is a method which uses three liquid crystal panels (three-panel method). This method is a method which transmits red (R) light, green (G) light, and blue (B) light to three respective liquid crystal panels, optically superposes the R, G, and B lights modulated by these liquid crystal panels, and obtains a single full color image. However, this method uses three liquid crystal panels, and consequently it gives rise to a serious problem of costs and may sacrifice miniaturization and lightening of weight which are the original advantages of the liquid crystal projector method.

Hence, a method of performing color display by the use of a single liquid crystal panel alone (single-panel method) has become the main trend in recent years. The representation of the single-panel type liquid crystal display unit or the liquid crystal projector, as is disclosed in Published Unexamined Patent Application No. 59-230383, has the structure where white light is irradiated by an optical system to a liquid crystal display panel equipped with a three-primary color filter pattern in mosaic or a stripe form. However, in this method, since light is all transmitted through the color filter, only about one-third of light emitted from a source of white light is utilized. Therefore, in order to obtain similar luminance as the three-panel method with the single-panel method, there is a need to use a light source bright by three times or more, however, there arises the problem that the increases in the size and weight and the high cost of an apparatus are caused. Such a reduction in the efficiency of light utilization is fatal to the liquid crystal projector method not only in the aspect of luminance but also in the aspect of costs.

A single-panel type liquid crystal projector method which has solved the aforementioned problem of luminance (efficiency of light utilization) is disclosed in Published-Unexamined Patent Application No. 4-60538. This method succeeds in removal of a color filter and makes absorption of light by a color filter zero. This method is one which irradiates white light to a plurality of dichroic mirrors arranged at angles slightly different from a direction in which light travels, divides the irradiated light into R, G, and B light beams, and transmits these R, G, and B light beams to the incident surface of a liquid crystal panel at different positions for each light beam through a micro lens array (new single-panel method). The present invention is one which has been based on a liquid projector according to the new single-panel method and has improved this.

The liquid crystal projector of the new single-panel method will be described in detail in reference to FIG. 3. White light is emitted from a light source 1 and made into a nearly collimated beam of light by a condenser lens 3. Thereafter, the white light is changed in direction by three dichroic mirrors 5 slightly different in angle and is reflected in a direction in which a liquid crystal panel 9 is arranged. The dichroic mirrors 5 have a function of separating white light into R, G, and B lights and also reflecting the separated R, G, and B lights in three directions slightly different from each other. For example, the dichroic mirror $5_R$ related to R light is arranged at an angle of $\theta=44.5°$, the dichroic mirror $5_G$ related to G light is arranged at an angle of $\theta=45°$, and the dichroic mirror $5_B$ related to B light is arranged at an angle of $\theta=45.5°$ in the figure. The R, G, and B lights separated by these dichroic mirrors 5 are incident at angles (e.g., $-1°$, $0°$, and $1°$) slightly different to the normal line of the incident surface of the liquid crystal panel 9 through a lens array 7.

To show this detail, the enlarged view of a dotted line portion 20 in FIG. 3 is shown in FIG. 4. White light is separated into light beams with a plurality of colors which are incident upon the liquid crystal panel 9, and the separated light beams are transmitted through the lens array 7 having convex surfaces at pitches nearly three times the cell pitch of the liquid crystal panel 9. The focal point of the lens array 7 is on the plurality of incident surfaces of the liquid crystal panel 9. Therefore, the light beams are focused on the incident surface of the liquid crystal panel 9 and produce fringes in order of B, G, and R. If a single pixel of the liquid crystal panel is formed in correspondence with the position of the fringes, it will be possible to perform color display with a single liquid crystal panel by controlling transmittance for each pixel.

Returning to FIG. 3, the light beams modulated for each pixel in the aforementioned way by the liquid crystal panel 9 are transmitted through the liquid crystal panel with controlled transmittance. After the transmitted light beams have been converged by a field lens 11, they are magnified by a projection lens 13 and are projected on a screen 15.

Such a new single-panel method makes an epoch in that high luminance can be realized by removing a color filter when performing color display. However, as with the single-panel method, a single color pixel is constituted by three pixels of a liquid crystal panel, so there arises the problem that the resolution of the liquid crystal panel itself needs to be enhanced by three times compared with the three-panel method. For example, the new single-panel method requires a liquid crystal panel with 92×10$^4$ cells for a VGA color display of 640 by 480 dots, however, a liquid crystal panel such as this becomes expensive, and on top of that, the aperture efficiency become reduced and the projection screen becomes dark because the rate at which thin-film transistors (TFT) and wires occupy becomes high. If this problem is attempted to be solved, the size of the panel will be increased. Consequently, an increase in the size of peripheral parts such as a lens and a mirror will lose the original advantages of the liquid crystal projector such as light weight and small size.

In order to eliminate the aforementioned disadvantages of the new single-panel method, structure employing high-speed response liquid crystal material such as ferroelectric liquid crystal material developed in recent years, such as that shown in FIG. 5, is conceivable as a method of realizing color display with a single liquid crystal panel without enhancing resolution. This method is a method which separates colors from each other not by employing a plurality of dichroic mirrors but by transmitting white light through a rotating color filter 17 and uses a single pixel of a liquid crystal panel in sequence for each of R, G, and B colors (color sequencing method). This method does not have the problem of resolution as does the new single-panel method, because a single color pixel is produced with a single pixel of a liquid crystal panel by making use of an illusion of an image remaining on an eye. The other parts in FIG. 5 basically have a similar function as those described in FIG. 3 and therefore the same reference numerals are applied to the other parts.

According to the color sequential method, resolution is reliably enhanced compared with the new single-panel method and also there is a less problem of an increase in the size and a rise in the cost of an apparatus. However, since a color filter is employed for separation of colors, there arises the problem that luminance which is the disadvantage of the old single-panel method is low.

The current known methods for a liquid crystal projector, as previously described, have a problem of either resolution or luminance, and there is not known method meeting all of these. The problem that is solved by the present invention is to devise a liquid crystal projector method in which resolution and luminance are favorable, by taking the advantages of the color sequential method ori the basis of the new single-panel method and combining these both methods together.

SUMMARY OF THE INVENTION

Accordingly, a first object of the present invention is to provide a liquid crystal projector which expresses a plurality of colors in sequence with a single pixel in a new single-panel method and has high resolution.

Also, a second object of the present invention is to provide a liquid crystal projector which removes a color filter in a color sequential method and has high luminance.

A third object of the present invention is to provide a liquid crystal projector which does not ruin small size and light weight which are the advantages of a liquid crystal projector method, while realizing high luminance and high resolution.

The aforementioned problem can be solved by a liquid crystal projector which comprises a light source for emitting white light, a separation mechanism for separating said white light into light beams with a plurality of colors at different angles, a liquid crystal panel for giving said light beams optical modulation, a lens mechanism for converging said light beams so that said light beams are incident upon respective pixels of said liquid crystal panel, a mechanism for magnifying and projecting said light beams emergent from said liquid crystal panel, and a moving mechanism for moving an incident position of said light beams on said liquid crystal panel an amount of an integer times a pitch between said pixels.

At this time, in a preferred form of the present invention, the moving mechanism is connected to the lens mechanism and has an operation of moving the lens mechanism in a direction parallel to an incident surface of the liquid crystal panel. Also, it is preferable that the moving mechanism moves the incident position of light beams onto the liquid crystal panel so that the colors appearing on the pixels become even temporally. The position of this moving mechanism is prescribed by a position control signal which is generated from a control circuit connected to the moving mechanism, and the transmittance for each pixel of the liquid crystal panel is prescribed by a transmittance control signal which is generated from the control circuit. The control circuit produces a united image by synchronizing the position control signal and the transmittance control signal with each other.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
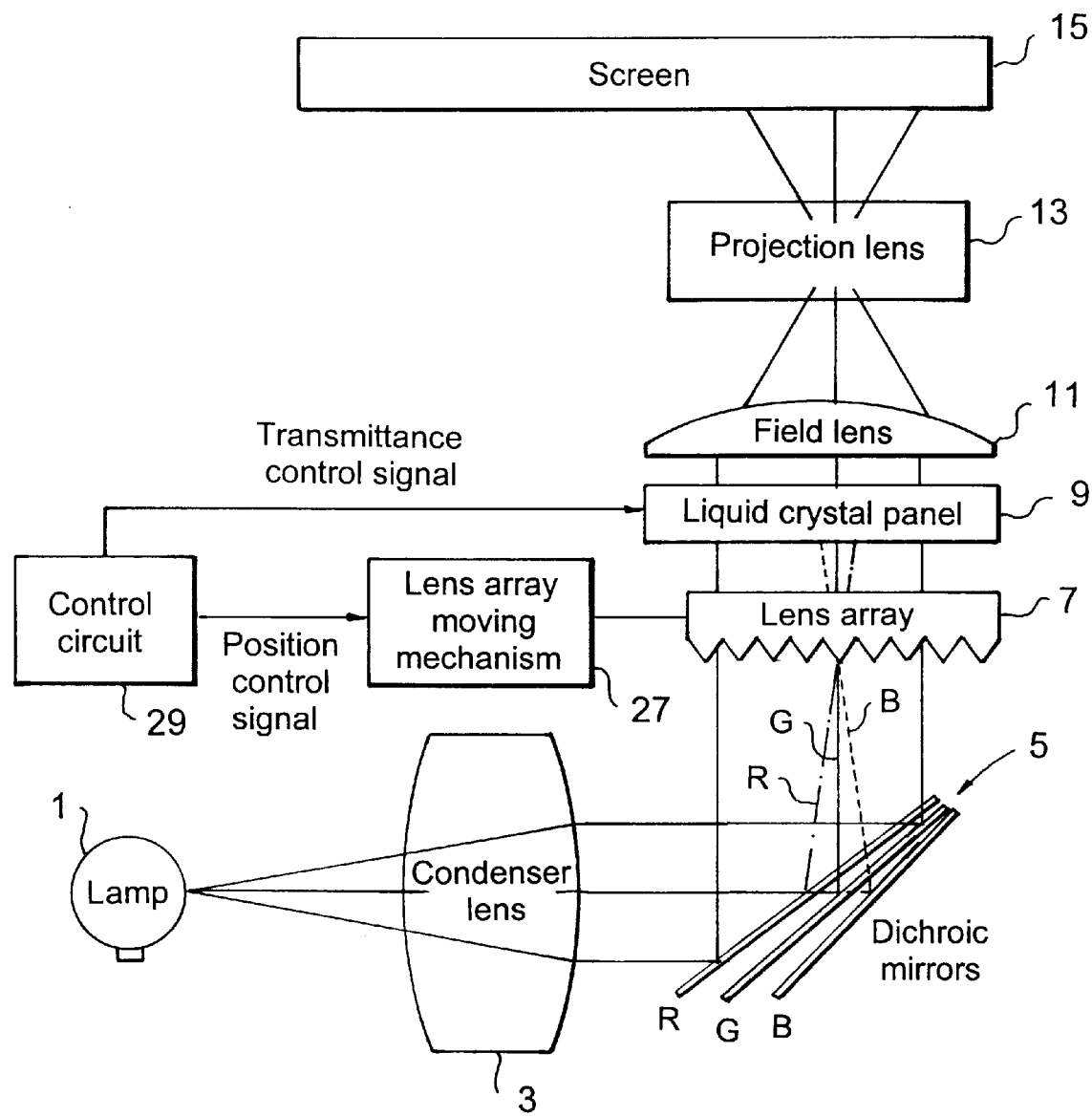
FIG. 1 is a schematic view showing one embodiment of the present invention.

One embodiment of the present invention is shown in FIG. 1. Even in the embodiment of the present invention, the same reference numerals have been applied to parts having the same function as the parts described in the background art. The basic structure of the present invention is identical with the aforementioned new single-panel method.

Therefore, white light emitted from a light source 1 is made into a nearly collimated beam of light by a condenser lens 3. Thereafter, the white light is separated into light beams with a plurality of colors by three dichroic mirrors 5 slightly different in angle, and the respective light beams are reflected at different directions toward a direction in which a liquid crystal panel 9 is arranged. The light beams separated with the dichroic mirrors 5 are incident at angles (e.g., −1°, 0°, and 1°) slightly different to the liquid crystal panel 9 through a lens array 7.

The separated light beams which are incident on the liquid crystal panel 9 are transmitted through the lens array 7 having convex surfaces at pitches nearly three times the cell pitch of the liquid crystal panel 9. The light beams from the lens array 7 are focused on the liquid crystal panel 9 and form fringes in order of B, G, and R. By forming a single pixel of the liquid crystal panel in correspondence with the position of the fringes and controlling transmittance for each pixel, it becomes possible to perform color display with a single liquid crystal panel. Next, the light beams modulated for each pixel by the liquid crystal panel 9 are transmitted through the liquid crystal panel with controlled transmittance. After the transmitted light beams have been converged by a field lens 11, they are enlarged by a projection lens 13 and are projected on a screen 15. The foregoing points follow the new single-panel method.

The present invention, however, differs in that the position of the light transmitted through the lens array 7 on the incident surface of the liquid crystal panel 9 is moved an amount of an integer times a pixel pitch. For this reason, in the embodiment of the present invention a moving mechanism 27 is connected to the lens array 7 and a control circuit 29 is provided for controlling the moving mechanism 27 and the liquid crystal panel 9. The moving mechanism 27 has a function of moving the lens array 7 in parallel with the incident surface of the liquid crystal panel 9 by an integer times a pixel pitch of the liquid crystal panel 9, in accordance with a position control signal that is generated from the control circuit 29. For example, driving by a linear stepping motor, and driving by a combination of a voice coil motor and a position sensor, are conceivable as a specific embodiment of the moving mechanism 27. Since the lens array 7 moves an integer times a pixel pitch of the liquid crystal panel 9 by the moving mechanism 27, a certain pixel becomes a R pixel or a G pixel or a B pixel, depending upon time. Therefore, as with the color sequential method, it becomes possible to express three primary colors with a single pixel, so that the problem of resolution which is the disadvantage of the new single-panel method is overcome, and since this is realized without completely employing a color filter, the present invention does not sacrifice luminance as does the color sequential method. A pixel next to the aforementioned pixel likewise begins at time when it operates as a G pixel and changes hue in sequence in order of a B pixel and a R pixel. Next, in synchronization with hue change of a pixel unit such as this, a transmittance control signal is supplied from the control circuit 29 to the liquid crystal panel 9 to change transmittance for each pixel. Therefore, the liquid crystal projector as a whole can display a single united color image.

Figure 2A:
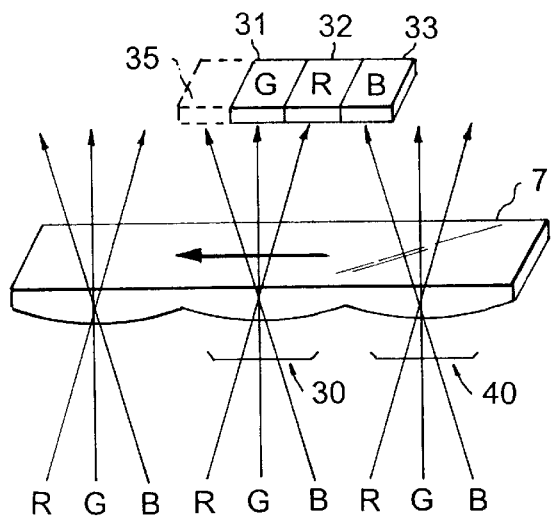
FIG. 2 is a diagram showing the positional relationship between the lens array and the pixels of the liquid crystal panel according to the embodiment of the present invention.
Figure 2B:
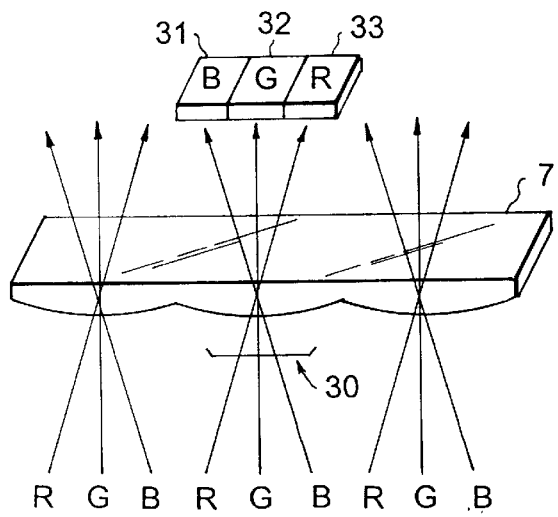
Figure 2C:
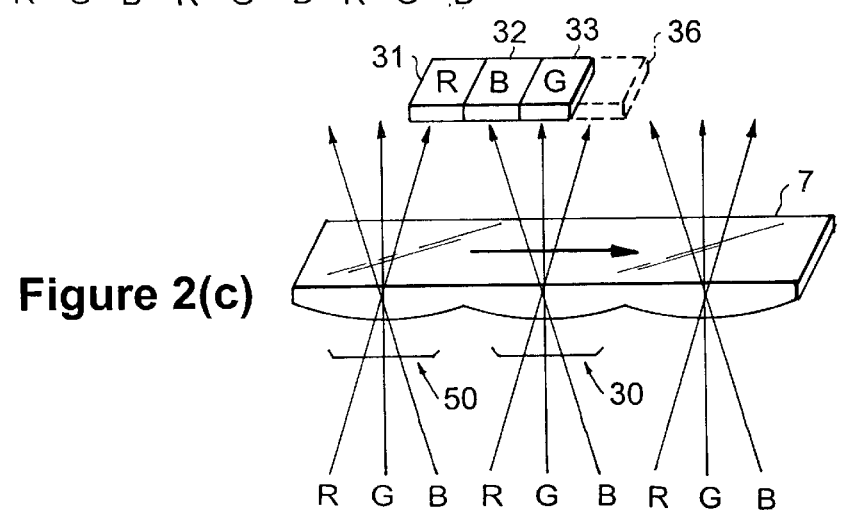
Figure 3:
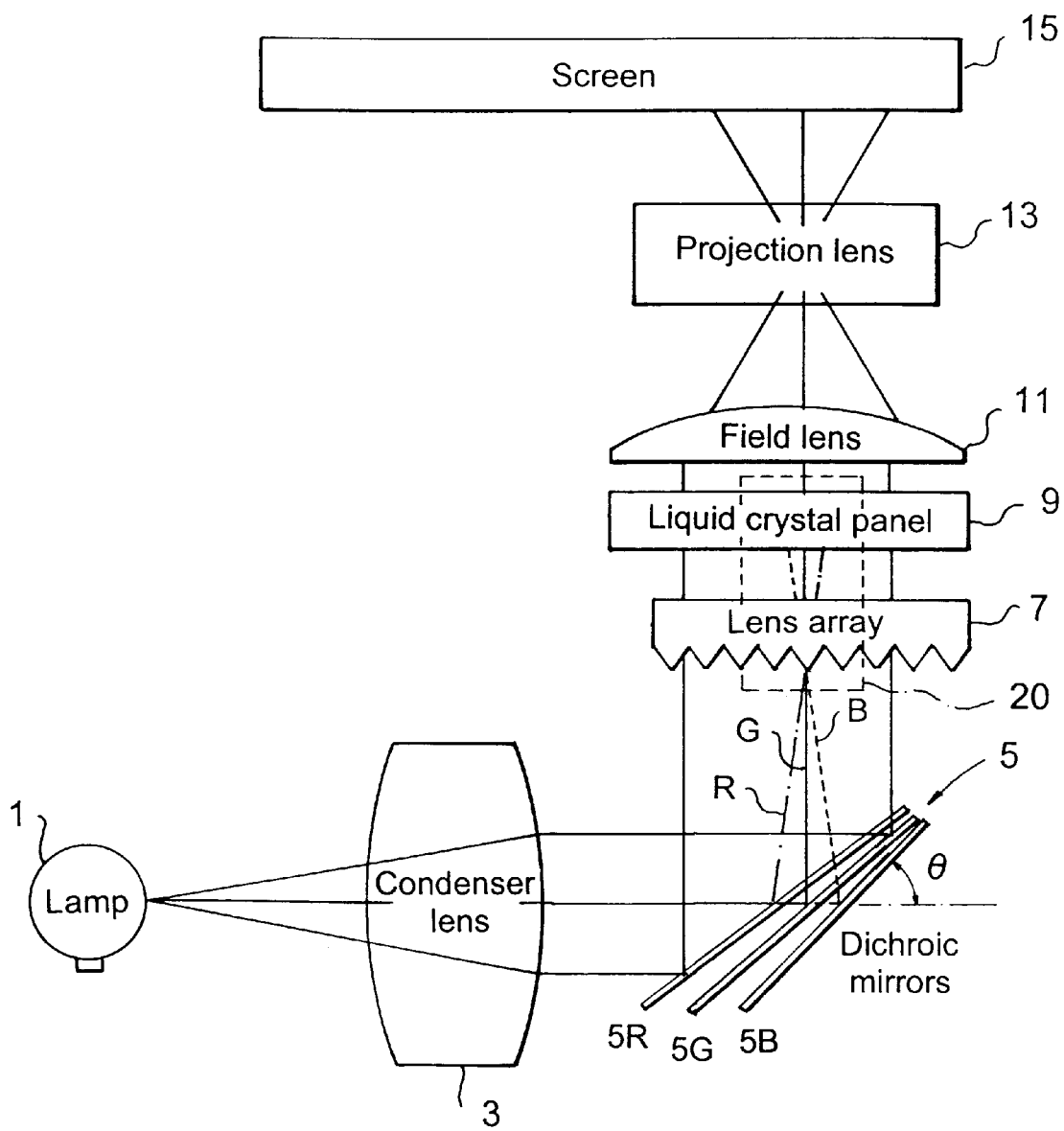
FIG. 3 is a schematic view of a conventional liquid crystal projector according to a new single-panel method.
Figure 4:
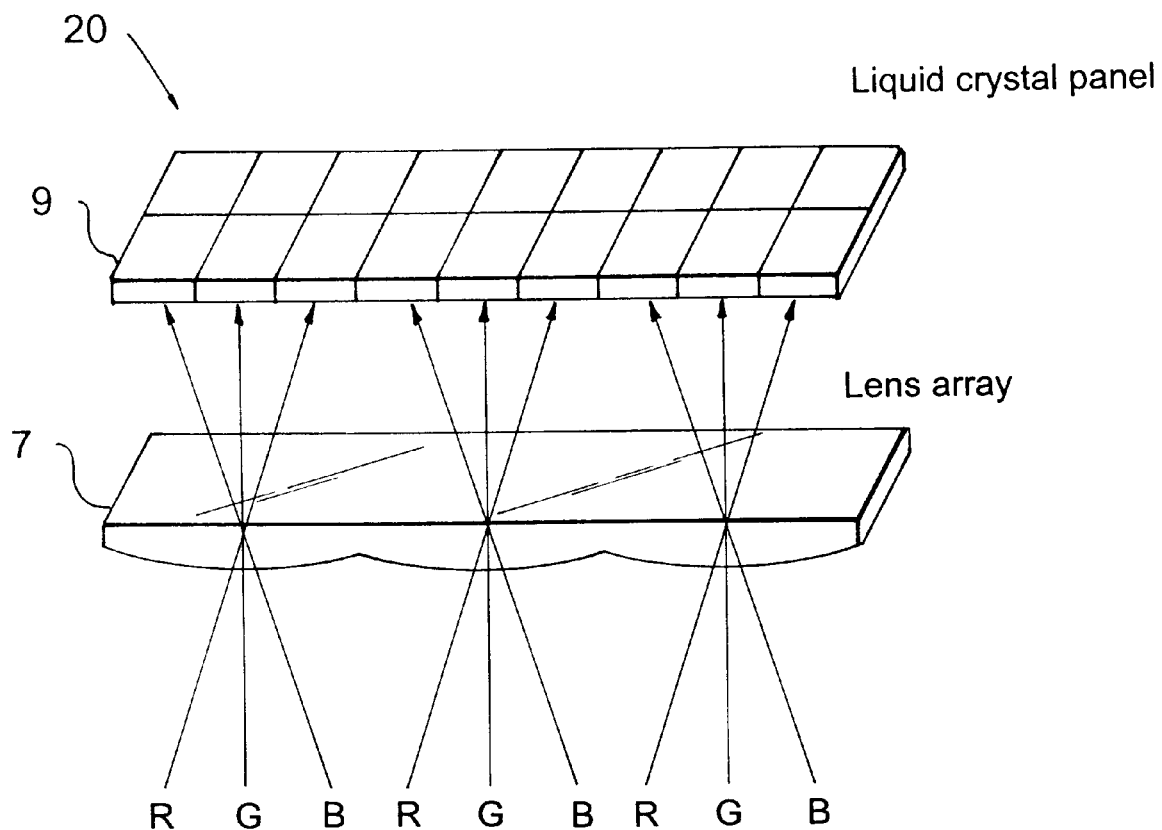
FIG. 4 is a diagram showing the positional relationship between the lens array and the pixels of the liquid crystal panel according to the new single-panel method.
Figure 5:
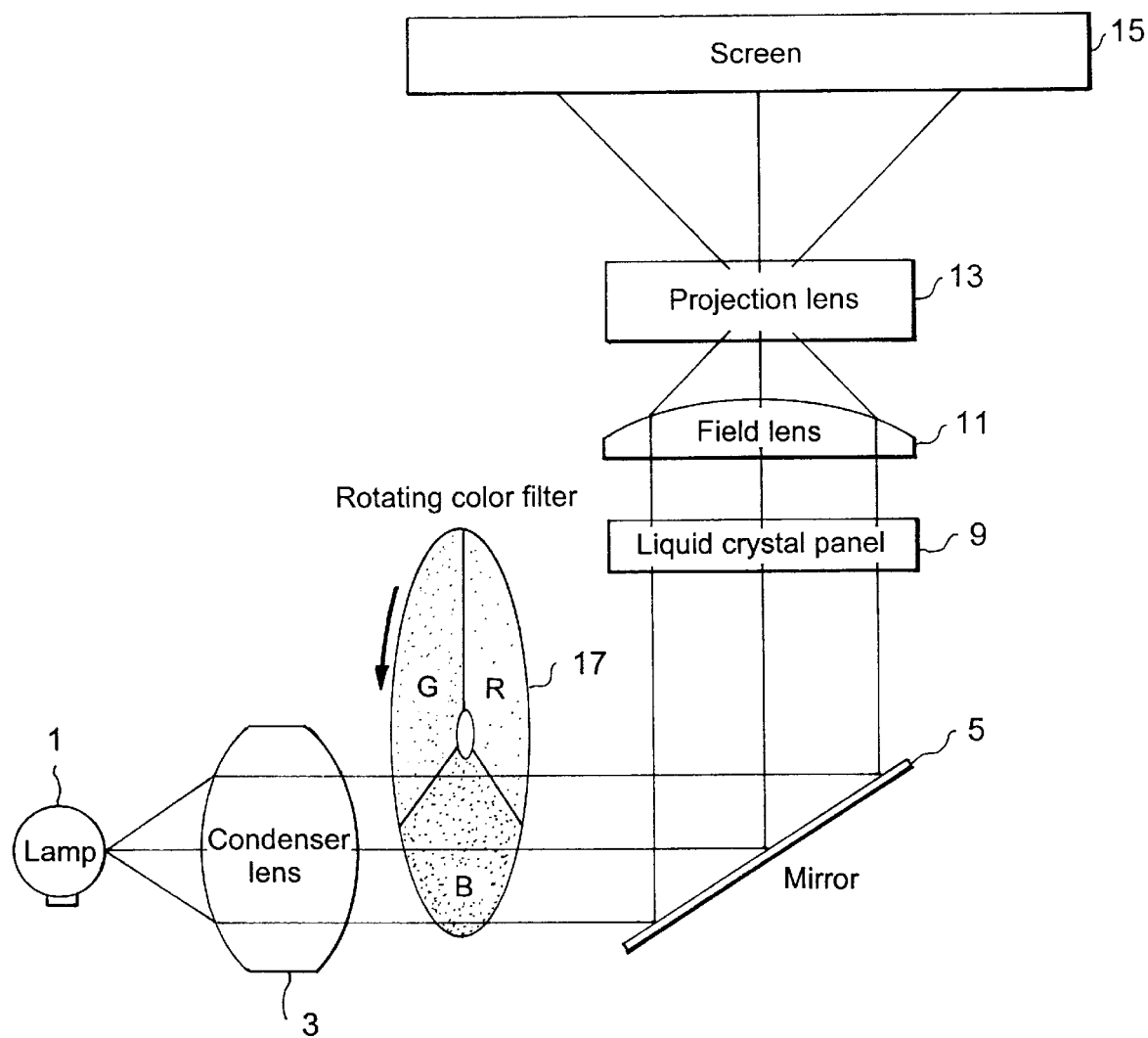
FIG. 5 is a schematic view of a conventional liquid crystal projector according to a color sequential method.

The operation of the embodiment of the present invention will be described with FIG. 2. As shown in FIG. 2(*b*), first suppose that three pixels 31, 32, and 33 of fringes constituted by light beams transmitted through a certain area 30 of the lens array 7 are in states of B, G, and R at a certain time $t_1$, respectively. The case where, thereafter, the lens array 7 has been moved an amount of one pixel pitch in a left direction at time $t_2$, is shown in FIG. 2(*a*). At this time, among the light beams transmitted through the area 30 of the lens array 7, the light beam related to G irradiates the pixel 31 and the light beam related to R irradiates the pixel 32. Also, among the light beams transmitted through the area 30 of the lens array 7, the light beam related to B irradiates a pixel 35 adjacent to the pixel 31 not displayed in FIG. 2(*b*). In addition, among the light beams transmitted through an area 40 on the right of the area 30 of the lens array 7, the light beam related to B irradiates the pixel 33. Consequently, looking at the pixels 31, 32, and 33, these pixels are changed from the array of FIG. 2(*b*) in the state of B, G, and R from left to the array of FIG. 2(*a*) in the state of G, R, and B from left.

Similarly, the case where the lens array 7 has been moved an amount of one pixel pitch in a right direction at time $t_3$ is shown in FIG. 2(*c*). At this time, among the light beams transmitted through the area 30 of the lens array 7, the light beam related to B irradiates the pixel 32 and the light beam related to G irradiates the pixel 33. Also, among the light beams transmitted through the area 30 of the lens array 7, the light beam related to R irradiates a pixel 36 adjacent to the pixel 33 not displayed in FIG. 2(*b*). In addition, among the light beams transmitted through an area 50 on the left of the area 30 of the lens array 7, the light beam related to R irradiates the pixel 31. Consequently, looking at the pixels 31, 32, and 33, these pixels are changed from the array of FIG. 2(*b*) in the state of B, G, and R from left to the array of FIG. 2(*c*) in the state of R, B, and G from left.

Assuming the position of the lens array 7 shown in FIG. 2(*b*) is zero, the position of the lens array 7 shown in FIG. 2(*a*) is taken to be −1 with a left direction as negative, and the position of the lens array 7 shown in FIG. 2(*c*) is taken to be 1 with a right direction as positive. If done in this way, the color of pixel 31 will be changed in order of B→G→R→B→G→R by repeatedly moving the lens array 7, for example, in order of 0→−1→1→0→−1→1 . . . . In the same way, the color of pixel 32 will be changed in order of G→R→B→G→R→B, and the color of pixel 33 will be changed in order of R→B→G→R→B→G. Next, by applying a desired electric potential to each pixel in correspondence with such color change of each pixel at times $t_1$, through $t_3$ and controlling transmittance, a color image such that one pixel is one color pixel can be reconstructed. Thus, the embodiment of the present invention has a similar feature as the color sequential method in that a color appearing on a single pixel is changed in sequence to perform color display.

For a method of moving the lens array 7, when temporal average is used, it is preferable that R, G, and B evenly appear on each pixel. For example, even when the position of the lens array 7 is defined as described above, a pattern of 0→1→2→3→−4→5→5→4→3→2→1→0 . . . is also conceivable as another pattern of movement which causes R, G, and B to evenly appear.

However, in the case where a dynamic-image display characteristic is regarded as important, there is no need to stick to even appearance of R, G. and B. For example, it is also possible to repeatedly move the lens array 7 in order of 0→−1→0→1→0→−1→0→1 . . . . In this case the pixel 31, for example, changes in order of B→G→B→R→B→G→B→R. Time for displaying B doubles compared with times for displaying R and G. Consequently, although picture quality is not high, the movement distance of the lens array 7 for each driving becomes shorter, so dynamic image display with even better responsibility becomes possible.

In the foregoing description, while the incident position of the light beam to the liquid crystal panel has been changed by moving the lens array, it is also possible to employ other methods. For example, a method of moving a liquid crystal panel while a lens array remains stationary, a method of moving both a lens array and a liquid crystal panel at the same time, a method of tilting dichroic mirrors on the whole and shifting direction of reflections, deflecting the light beam by means of interposing a galvanomirror, a variable shape prism, or the like between dichroic mirrors and the lens array etc., are conceivable. That is, the subject matter of the present invention will be achievable, so long as the incident portion of a light beam onto a liquid crystal panel can be moved a quantity of an integer times a pixel pitch as a result.

The above embodiment shows the example in which the white light emitted from the light source is separated into light beams with plural colors by reflection from the dichroic mirror. However, such the separation is achieved by transmission from so-called a transmissive phase volume hologram or a transmissive phase volume grating.

According to the present invention, as described above, since the advantages of the color sequential method have been taken on the basis of the new single-panel method, it is possible to provide a liquid crystal projector that is excellent in resolution and luminance.

More specifically, since on the basis of a liquid crystal projector of the color sequential method the present invention has removed a color filter and performed color separation by a dichroic mirrors instead, the invention is capable of providing a liquid crystal projector that has eliminated low luminance which is the disadvantage of the liquid crystal projector of the color sequential method.

Also, the present invention moves the lens array in a direction parallel to the surface of the liquid crystal panel instead of employing a rotating color filter, in order that three colors can be expressed in sequence with a single pixel, while being based on the liquid crystal projector of the new single-panel method. Accordingly, the present invention is capable of providing a liquid crystal projector that has eliminated low resolution which is the disadvantage of the liquid crystal projector of the new single-panel method.

Furthermore, because the present invention has realized high-luminance and high-resolution color display by the use of a single liquid crystal panel, the invention is capable of providing a color display unit that does not ruin small size and light weight which are the original advantages of the liquid crystal projector method, as compared with the CRT method.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A liquid crystal projector comprising:
   a light source for emitting white light;
   a separation mechanism for separating said white light into light beams with a plurality of colors at different angles;
   a liquid crystal panel for giving said light beams optical modulation;
   a lens mechanism for converging said light beams so that said light beams are incident upon respective pixels of said liquid crystal panel;
   a mechanism for magnifying and projecting said light beams emergent from said liquid crystal panel; and
   a moving mechanism for moving an incident position of said light beams on said liquid crystal panel an amount of an integer times a pitch between said pixels.

2. A liquid crystal projector comprising:
   a light source for emitting white light;
   a separation-reflection mechanism for separating said white light into light beams with a plurality of colors and reflecting said light beams at different angles;
   a liquid crystal panel for giving said light beams optical modulation;
   a lens mechanism for converging said light beams so that said light beams are incident upon respective pixels of said liquid crystal panel;
   a mechanism for magnifying and projecting said light beams emergent from said liquid crystal panel; and
   a moving mechanism for moving an incident position of said light beams on said liquid crystal panel an amount of an integer times a pitch between said pixels.

3. The liquid crystal projector as set forth in claim 1, wherein said moving mechanism is connected to said lens mechanism and moves said lens mechanism in a direction parallel to an incident surface of said liquid crystal panel.

4. The liquid crystal projector as set forth in claim 2, wherein said moving mechanism is connected to said lens mechanism and moves said lens mechanism in a direction parallel to an incident surface of said liquid crystal panel.

5. The liquid crystal projector as set forth in claim 1, wherein said moving mechanism moves said incident position so that said colors appearing on said pixels become even temporally.

6. The liquid crystal projector as set forth in claim 2, wherein said moving mechanism moves said incident position so that said colors appearing on said pixels become even temporally.

7. In a method of driving a liquid crystal projector which comprises a light source for emitting white light, a separation mechanism for separating said white light into light beams with a plurality of colors at different angles, a lens mechanism for converging said light beams, a liquid crystal panel for giving optical modulation to the light beams converged by said lens mechanism, and a mechanism for magnifying and projecting said light beams emergent from said liquid crystal panel, the method of driving the liquid crystal projector wherein said lens mechanism is moved in a direction parallel to an incident surface of said liquid crystal panel so that said plurality of colors appear temporally evenly on pixels of said liquid crystal panel.

8. In a method of driving a liquid crystal projector which comprises a light source for emitting white light, a separation-reflection mechanism for separating said white light into light beams with a plurality of colors and reflecting said light beams at different angles, a lens mechanism for converging said light beams, a liquid crystal panel for giving optical modulation to the light beams converged by said lens mechanism, and a mechanism for magnifying and projecting said light beams emergent from said liquid crystal panel, the method of driving the liquid crystal projector wherein said lens mechanism is moved in a direction parallel to an incident surface of said liquid crystal panel so that said plurality of colors appear temporally evenly on pixels of said liquid crystal panel.

9. The method of driving the liquid crystal projector as set forth in claim 7, wherein an incident position of said light beams onto said liquid crystal panel is moved an amount of distance of an integer times a pitch between pixels according to said liquid crystal panel, with single driving.

10. The method of driving the liquid crystal projector as set forth in claim 8, wherein an incident position of said light beams onto said liquid crystal panel is moved an amount of distance of an integer times a pitch between pixels according to said liquid crystal panel, with single driving.

* * * * *